United States Patent
Carr et al.

(10) Patent No.: US 12,537,673 B2
(45) Date of Patent: Jan. 27, 2026

(54) SYSTEMS AND METHODS FOR DISTRIBUTED PROCESSING OF SECURE MULTI-PARTY COMPUTATIONS

(71) Applicant: Enveil, Inc., Fulton, MD (US)

(72) Inventors: Ryan Carr, Fulton, MD (US); Jeffery Hein, Glen Burnie, MD (US)

(73) Assignee: Enveil, Inc., Fulton, MD (US)

( * ) Notice: Subject to any disclaimer, the term of this patent is extended or adjusted under 35 U.S.C. 154(b) by 0 days.

(21) Appl. No.: 18/754,085

(22) Filed: Jun. 25, 2024

(65) Prior Publication Data

US 2025/0038966 A1    Jan. 30, 2025

Related U.S. Application Data

(60) Provisional application No. 63/529,667, filed on Jul. 28, 2023.

(51) Int. Cl.
*H04L 9/08* (2006.01)
*H04L 67/1001* (2022.01)

(52) U.S. Cl.
CPC .......... *H04L 9/085* (2013.01); *H04L 67/1001* (2022.05); *H04L 2209/46* (2013.01)

(58) Field of Classification Search
None
See application file for complete search history.

(56) References Cited

U.S. PATENT DOCUMENTS

| | | | | |
|---|---|---|---|---|
| 8,159,961 B1* | 4/2012 | Rai | ........................ | H04L 67/02 370/252 |
| 8,631,410 B2* | 1/2014 | Fu | ....................... | H04L 67/1001 718/100 |
| 8,959,226 B2* | 2/2015 | Arrowood | ........... | H04L 67/1001 709/224 |
| 9,158,593 B2* | 10/2015 | Kurabayashi | ......... | G06F 9/5083 |
| 9,479,358 B2* | 10/2016 | Klosowski | .......... | H04L 12/6418 |
| 10,148,736 B1* | 12/2018 | Lee | ...................... | G06F 9/5066 |
| 10,637,670 B2* | 4/2020 | Lindell | ................. | H04L 9/3239 |
| 10,887,100 B2* | 1/2021 | Wentz | ................. | G06F 21/6218 |
| 11,050,725 B2* | 6/2021 | Becher | .................... | H04L 9/085 |
| 11,368,311 B2* | 6/2022 | Veeningen | ............ | H04L 9/3218 |
| 11,606,203 B2* | 3/2023 | Fan | ........................ | G06N 20/00 |
| 11,621,834 B2* | 4/2023 | Will | ...................... | H04L 9/0643 713/168 |
| 11,635,995 B2* | 4/2023 | Bahl | ..................... | G06F 9/3877 718/104 |
| 11,831,682 B2* | 11/2023 | Crabtree | ............... | H04L 41/149 |
| 11,902,429 B2* | 2/2024 | Modica | ................... | H04L 9/085 |
| 2012/0002811 A1* | 1/2012 | Smart | .................... | H04L 9/085 380/255 |
| 2022/0255731 A1* | 8/2022 | Modica | ................... | H04L 9/008 |
| 2024/0045730 A1* | 2/2024 | Joshi | ....................... | H04L 67/10 |
| 2025/0038966 A1* | 1/2025 | Carr | ...................... | H04L 9/085 |

* cited by examiner

*Primary Examiner* — Backhean Tiv
(74) *Attorney, Agent, or Firm* — Carr & Ferrell LLP

(57) ABSTRACT

Disclosed herein are systems and methods for distributed processing of secure multi-party computations. One example method includes dividing an overall SMPC circuit into partitions to be processed by different computers, balancing the computational load across the computers by ensuring the partitions are of similar sizes, identifying and minimizing a number of inputs and outputs crossing partition boundaries to optimize performance and employing a controller computer to orchestrate distributed computational tasks and recover from potential system failures.

20 Claims, 6 Drawing Sheets

SYSTEMS AND METHODS FOR DISTRIBUTED PROCESSING OF SECURE MULTI-PARTY COMPUTATIONS

CROSS REFERENCE TO RELATED APPLICATIONS

This application claims the benefit and priority of U.S. Provisional Application Ser. No. 63/529,667, filed on Jul. 28, 2023, which is hereby incorporated by reference herein in its entirety, including all references and appendices cited therein.

FIELD

The present disclosure pertains to secure multi-party computation (SMPC) systems and methods for distributed computing.

SUMMARY

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions. One general aspect includes a method for orchestrating distributed secure multi-party computations (SMPC). The method also includes receiving a structure of a computation, a number of secret inputs per party, and inputs to the computation from each participating party. The method also includes determining a partitioning of an overall SMPC circuit into multiple partitions for processing by multiple servicer computers. The method also includes instructing the multiple servicer computers to handle distinct partitions of the overall SMPC circuit, the distinct partitions being of similar size to balance computational workload. The method also includes minimizing the number of inputs and outputs crossing partition boundaries to optimize performance. The method also includes initializing a set of pre-configured building blocks that represent circuits of supported SMPC operations. The method also includes instructing the multiple servicer computers to construct the overall SMPC circuit from the set of pre-configured building blocks. The method also includes maintaining an ordering of circuit partitions and an assignment of the circuit partitions to the multiple servicer computers. The method also includes monitoring completion of the circuit partitions and updating the set of eligible circuit partitions. Other embodiments of this aspect include corresponding computer systems, apparatus, and computer programs recorded on one or more computer storage devices, each configured to perform the actions of the methods.

Implementations may include one or more of the following features. The method may include initiating, by the controller computer system, a failure recovery process upon a hardware or software failure, including re-assignment of the circuit partitions. The method may include dynamically provisioning additional servicer computers on-demand to enhance computational resource availability. The method may include grouping servicer computers with similar computational capabilities and network bandwidth to optimize the execution of circuit partitions. The step of monitoring completion of the circuit partitions includes tracking progress of each partition and reassigning unfinished partitions upon a servicer computer failure. The backup controller synchronizes state data with a primary controller and takes over upon failure of the primary controller. The step of updating the set of eligible circuit partitions includes re-evaluating partition dependencies and making newly completed partitions eligible for subsequent computations. Implementations of the described techniques may include hardware, a method or process, or computer software on a computer-accessible medium.

One general aspect includes a method for enhancing computational power of secure multi-party computations (SMPC) in a distributed system. The method also includes dividing an overall SMPC circuit into partitions to be processed by different computers; balancing a computational load of the overall SMPC circuit across the different computers by ensuring that each partition has an approximately equal number of computational operations and data elements to be processed, thereby achieving partitions of comparable computational complexity and size; identifying and minimizing a number of inputs and outputs crossing partition boundaries to optimize performance; and employing a controller computer to orchestrate distributed computational tasks and recover from potential system failures. Other embodiments of this aspect include corresponding computer systems, apparatus, and computer programs recorded on one or more computer storage devices, each configured to perform the actions of the methods.

Implementations may include one or more of the following features. The step of dividing the overall SMPC circuit into partitions includes minimizing inter-partition communication to optimize performance. Balancing the computational load includes adjusting the size of the partitions to ensure similar workload distribution across the distributed system. The controller computer secures data transmitted between the partitions using cryptographic protocols to prevent unauthorized access during a computation process. The method may include the step of using redundancy and checkpointing techniques to periodically save a state of a computation process, allowing for restoration and continuation in case of a failure. The controller computer monitors system performance and reassigns computational tasks to maintain stability and performance. Implementations of the described techniques may include hardware, a method or process, or computer software on a computer-accessible medium.

One general aspect includes a distributed secure multi-party computation (SMPC) system. The distributed secure multi-party computation also includes multiple computers, each administered by a participating party, each configured to handle different parts of an overall SMPC circuit through a process of circuit partitioning, where circuit partitions balance a workload between the multiple computers and are designed to minimize inputs and outputs crossing partition boundaries; and a controller computer responsible for orchestrating distribution of computational tasks, assignment of the partitions, and recovery of system operation upon a failure. Other embodiments of this aspect include corresponding computer systems, apparatus, and computer programs recorded on one or more computer storage devices, each configured to perform the actions of the methods.

Implementations may include one or more of the following features. The system where each computer is configured to handle computations on private data within a secure environment to ensure data integrity and confidentiality. The controller computer includes a module that adjusts the assignment of circuit partitions based on computational load and performance metrics of each participating computer. Communication between the controller computer and the multiple computers uses cryptographic protocols to ensure confidentiality and integrity of data exchanged. The system may include a subsystem within the controller computer configured to track a status and performance of each computer continuously. The controller computer employs predictive algorithms to foresee potential system failures and reassigns tasks to maintain stability and performance. The system incorporates redundancy by maintaining backup copies of critical data and computation states across the multiple computers, enabling seamless recovery and continuation of the SMPC process upon a failure. Implementations of the described techniques may include hardware, a method or process, or computer software on a computer-accessible medium.

DETAILED DESCRIPTION OF EXAMPLE EMBODIMENTS

Overview

Figure 1A:
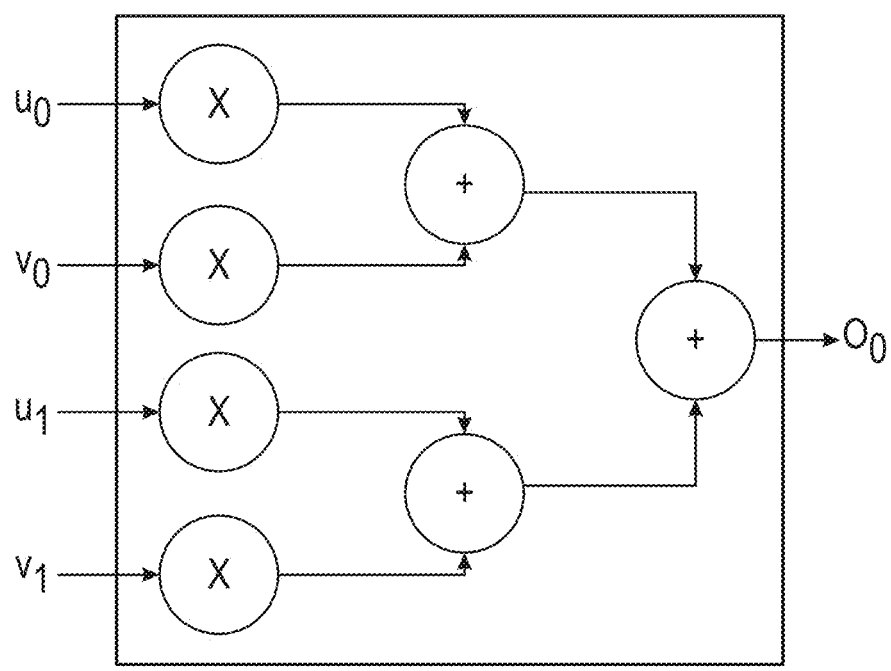
FIG. 1A illustrates arithmetic circuits and their composition to compute a dot product of vectors.

Secure Multi-Party Computation (SMPC) protocols are a family of cryptographic protocols that allow two or more participating parties to jointly compute some function depending upon inputs from each party and provide the output of the function to one or more participants. The SMPC protocol protects the inputs of some or all participating parties, such that no other participating party is able to learn anything about the protected inputs. Only the final output of the computed function is accessible, and only to the specific parties agreed to at the start of the protocol. Different SMPC schemes exist that support different types of functions: the Yao Garbled Circuits scheme support any function that can be expressed as a binary circuit of AND, OR, and NOT gates connected by wires carrying true or false values, while the Arithmetic Secret Sharing scheme and Boolean Secret Sharing scheme support functions that can be expressed as a circuit of arithmetic (i.e., addition and multiplication) or Boolean (i.e., AND, OR, and NOT) operations over values in some input domain. So-called "ABY" schemes also exist, which support computations that are a combination of functions supported by the Arithmetic Secret Sharing, Boolean Secret Sharing, and Yao Garbled Circuits schemes and contain sub-protocols for switching between these schemes.

SMPC protocol schemes discussed above allow the function to be computed by the protocol to be expressed as a "circuit" of operations of the supported types, and running the protocol to compute the function over the participating parties' inputs involves executing one or more cryptographic sub-protocols for each element in the circuit. Because each element in the circuit must be one of the primitive computation types supported by the protocol (i.e., a logical gate, arithmetic addition or multiplication, or Boolean operation), circuit for complex computations, such as analytics over large scale data sets or machine learning computations, can easily require millions or even billions of circuit elements and corresponding cryptographic sub-protocols to execute. The speed of each subprotocol execution is typically bounded by the availability of computation resources and/or network bandwidth between the parties participating in the protocol. Complex computations can therefore be impractical to execute using standard SMPC protocols, which operate using a single process for each participating party and a single network connection between parties The systems and methods of the present disclosure use SMPC to compute large, complex functions by distributing the protocol across multiple computers administered by each participating party. This increases the amount of computational power available to all parties and increases the amount of network bandwidth between parties, which increases the throughput of SMPC computations and makes larger, more complex computations possible. In order to adapt the standard SMPC protocol into one that can run distributed on a cluster, several new techniques must be used. These can be categorized into circuit partitioning, protocol orchestration, and failure recovery.

It will be understood that with respect to the general aspects of distributed secure multi-party computation, there are a plurality of different, and sometimes conflicting meanings of "distributed." Some systems appear to focus on distributing the offline generation of cryptographic primitives required by the computation, and not parallelizing the execution of the protocol itself. However, the systems and methods of the present disclosure can be configured to analyze the structure of the computation and determine which parts can be parallelized.

In order for distributed processing of SMPC circuits to benefit performance, the computers involved in the processing for each party must handle different parts of the overall SMPC circuit. The process of breaking up the overall circuit into parts that can be processed separately is called "partitioning," and the separate pieces are called "partitions." Any inputs or outputs of circuit elements that cross partition boundaries will require communication between the computers processing those partitions, which carries performance penalties. The partitions should also have similar size to one another, in order to balance the workload performed by the different computers. The objectives of computing a circuit partitioning are therefore to keep the number of inputs and outputs that cross partition boundaries low relative to the overall size of the circuit, while also ensuring that the different partitions have similar size. Finding an optimal partition that maximizes both of these objectives is a computationally hard (i.e., NP-complete) problem, and therefore any system that needs to compute such partitions will be based on heuristics.

The systems and methods of the present disclosure are pre-configured with "building blocks," which are circuits of supported SMPC operations that execute common computational functions (e.g., floating point arithmetic circuits for a Yao Garbled Circuit, or a vector dot product function for an arithmetic circuit) whose number of internal SMPC operations is high relative to its number of input and output values. The overall desired circuit is constructed from these building blocks whenever possible, and the system permits new building blocks to be specified by users for desired operations that are not already included in a building block. The system represents the overall SMPC circuit as a network of these building blocks, with edges connecting blocks that have inputs and outputs to one another.

Example Embodiments

Figure 1B:
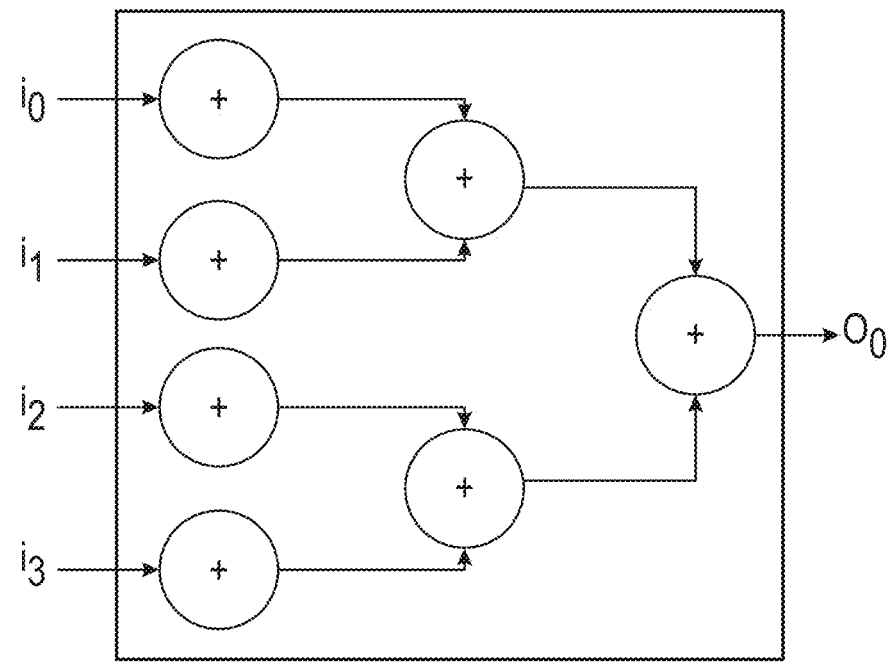
FIG. 1B illustrates an arithmetic circuit.
Figure 1C:
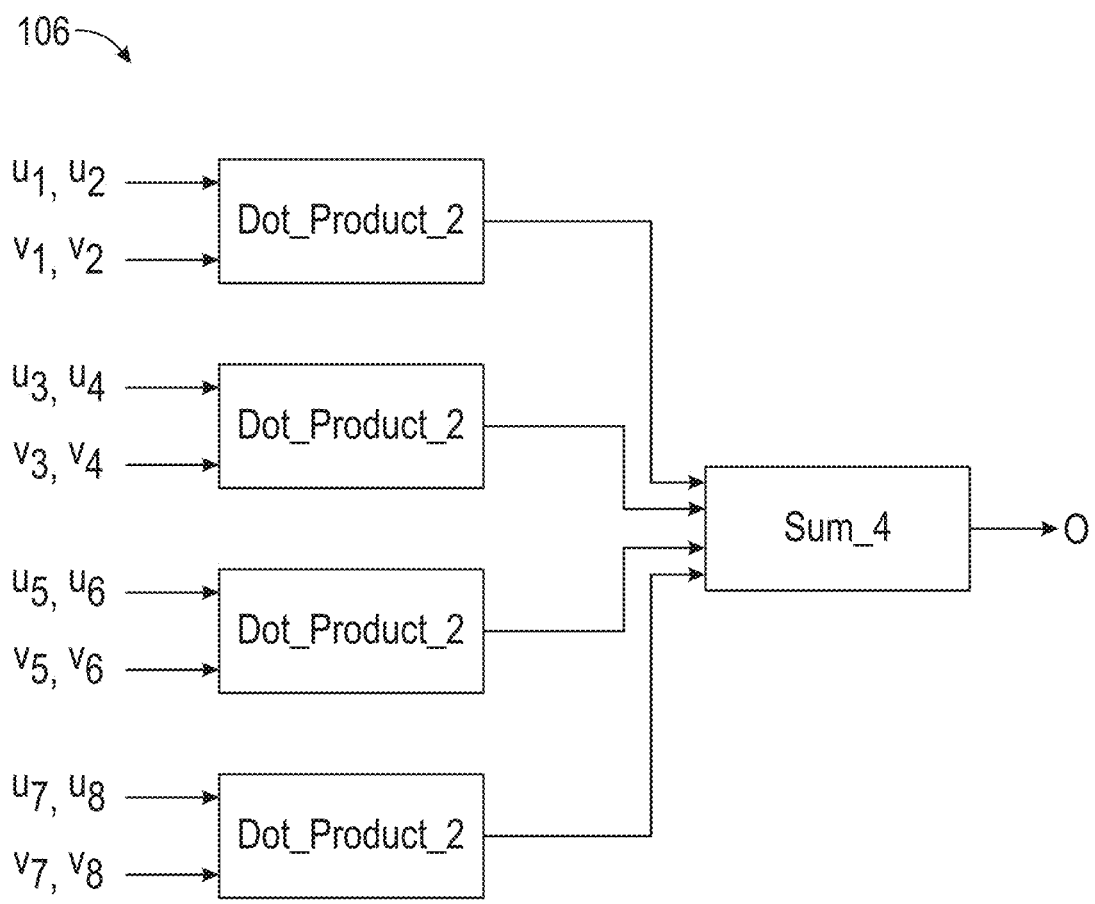
FIG. 1C illustrates the combination of multiple dot product and sum circuits for distributed computation.

FIG. 1A illustrates a building block, arithmetic circuit 102, for computing the dot product of two vectors of length two. FIG. 1B illustrates a building block, arithmetic circuit 104, for computing the sum of four numbers. FIG. 1C illustrates a circuit diagram that composes these two building blocks to compute the dot product of vectors of length eight.

The arithmetic circuit 102 in FIG. 1A includes several components and operations. The inputs to the arithmetic circuit 102 are labeled as u1, u1, v0, and v1, which represent the elements of two vectors. Specifically, u0 and u1 are the components of the first vector, while v0 and v/are the components of the second vector. These inputs are used in arithmetic operations within the block to compute the dot product.

Within the arithmetic circuit 102, circles labeled with X and + represent multiplication and addition operations, respectively. The circles with X indicate where the corresponding elements of the vectors are multiplied together. For instance, one X operation multiplies u0 by v0, and another X operation multiplies u1 by v1. These multiplication operations are used for calculating the intermediate products of the dot product computation.

After these multiplications, the results are passed to the circles labeled with +, which perform the addition operations. The purpose of these addition operations is to sum the products obtained from the multiplication operations. Specifically, the outputs of the multiplication circles are added together to compute the final dot product: (u0*v0)+ (u1*v1). This sum is the ultimate result of the arithmetic circuit 102, representing the dot product of the two input vectors.

The arithmetic circuit 104 in FIG. 1B is designed to compute the sum of four numbers. The inputs to this block are typically labeled i0, i1, i2, and i3 representing the four numbers to be summed.

Within the arithmetic circuit 104, the circles labeled with + indicate addition operations. These circles perform the arithmetic addition necessary to compute the sum of the four input numbers. Specifically, each + circle represents the addition of two numbers at a time. For example, the first addition operation might add i0 and i1 and the second addition operation might add i3 and i4. The results of these two additions are then fed into another addition operation, which sums these intermediate results to produce a final output (i0+i1)+ (i2+i3).

FIG. 1C illustrates an arithmetic operation 106 combining multiple "dot_product_2" blocks with a "sum_4" block. Each "dot_product_2" block computes the dot product of two pairs of input vectors. Specifically, the inputs u1, u2 and v1, v2 are fed into the first "dot_product_2" block, u3, u4 and v3, v4 into the second, u5, u6 and v5, v6 into the third, and u7, u8 and v7, v8 into the fourth. The outputs from these "dot_product_2" blocks, which are the individual dot products, are then directed into the "sum_4" block.

The "sum_4" block takes these four dot products as its inputs and performs an addition operation to produce a single output. This hierarchical structure enables the computation of a more complex mathematical operation by breaking it down into simpler, manageable components. The design leverages the efficiency of smaller arithmetic units to handle larger calculations in a distributed manner, which is essential for applications in SMPC systems.

This hierarchical approach to addition ensures that the summation process is both efficient and manageable within the circuit's architecture. The use of multiple addition operations allows the block to handle the addition of four numbers in a structured manner, ensuring accurate and secure computation within the SMPC framework.

Because each building block contains a large number of internal operations relative to its input and output values, treating each such block as a circuit partition will provide reasonably good performance. An example system may also choose to use other heuristics to combine multiple blocks into one circuit partition.

In a distributed SMPC protocol, each participating party has several computers assigned to work on the protocol. These computers can be provisioned ahead of time or provisioned on-demand as the protocol starts (e.g., using a technology like Kubernetes or any container service). In order to realize the performance benefits of having multiple computers per party, these computers must be assigned separate pieces of the overall SMPC protocol, in a way that minimizes computation overlap and exchange of data between computers owned by the same participating party. The system is configured to dynamically provision additional servicer computers on-demand as the protocol starts. This dynamic provisioning enhances computational resource availability and allows the system to scale efficiently in response to the computational demands of the SMPC process. In some embodiments, each computer in the system is configured to handle computations on private data within a secure environment. This secure environment, often referred to as a secure enclave, ensures the integrity and confidentiality of the data being processed. Dynamically provisioning additional servicer computers on-demand as the protocol starts enhances computational resource availability. This feature allows the system to scale efficiently in response to the computational demands of the SMPC process. When the protocol begins, additional servicer computers can be provisioned dynamically, ensuring that sufficient computational resources are available to handle the workload. This dynamic provisioning is essential for maintaining optimal performance and adapting to varying computational requirements. Grouping servicer computers with similar computational capabilities and network bandwidth optimizes the execution of circuit partitions. By assigning servicer computers with comparable performance characteristics to the same tasks, the system ensures that the execution of circuit partitions is balanced and efficient. This grouping reduces the likelihood of bottlenecks caused by disparities in computational power or network speed among the servicer computers, leading to more consistent and reliable performance.

Figure 2:
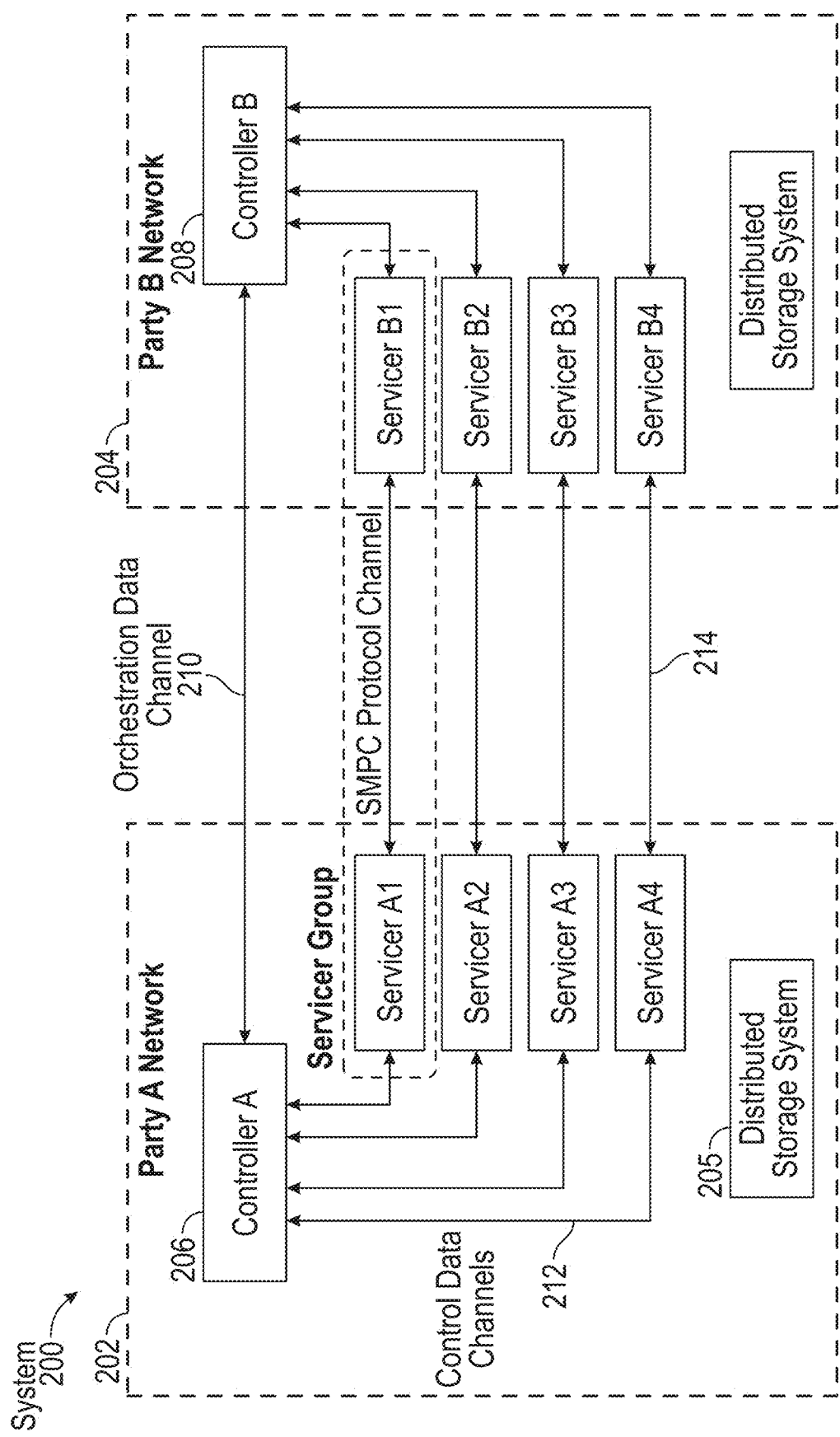
FIG. 2 illustrates an architecture of a system including controllers, servicers, and
communication channels between them.

Turning now to FIG. 2, in this architecture, an example SMPC system (hereinafter "system 200") is illustrated. One computer per party has the role of "Controller," while all other computers are as "Servicers." In this example, there are two networks, such as Party A Network 202 and Party B Network 204. Each of the networks includes a controller, such as Controller A 206 of Party A Network 202 and Controller B 208 of Party B Network 204.

An orchestration data channel 210 can be established between Controller A 206 and Controller B 208. The orchestration data channel 210 facilitates communication between Controller A 206 and Controller B 208. This channel is responsible for coordinating the actions of the controllers, enabling them to synchronize the operations of their respective servicers. Through orchestration data channel 210, the controllers exchange information regarding the status of circuit partitions, the availability of computational resources, and any necessary adjustments to the execution of the SMPC protocol. This ensures that all participating parties remain aligned and can dynamically respond to changes in the computation environment, such as network bandwidth fluctuations or computational load balancing. In one example, the Party A Network 202 includes several servicer nodes such as Servicer A1-A4.

The Servicers A1-A4 are each individually communicatively coupled to Controller A 206 through Control Data Channels, such as Control Data Channel 212. SMPC control data channels, such as SMPC control data channel 214, can communicatively couple servicers between Party A Network 202 and Party B Network 204. For example, SMPC control data channel 214 can be established between Servicer A4 of Party A Network 202 and Servicer B4 of Party B Network 204. In some implementations, communication between the controller computer and the multiple computers is encrypted using secure communication protocols. These protocols ensure that the data exchanged remains confidential and its integrity is protected against unauthorized access. As noted above, the system 200 includes the distributed storage system 205 integrated with the servicer nodes. The distributed storage system 205 enables state and output data to be stored and retrieved efficiently, facilitating data recovery and continuity of operations across the network. Thus, critical data and computation states can be stored and retrieved as needed. In other words, the system incorporates redundancy by maintaining backup copies of critical data and computation states across the multiple computers, enabling seamless recovery and continuation of the SMPC process upon a failure.

When the parties agree to begin a computation using SMPC, the parties specify the overall structure of the computation (i.e., whether it is an analytic, machine learning training, and so forth), the number of secret inputs per party, and each party secretly determines what its inputs to the computation will be. The controller in one party (agreed upon by all parties ahead of time) serves as the "main controller" for the protocol, and contacts all other controllers to receive the list of servicers available to each party, along with metadata about their location, network bandwidth availability, and computational capabilities. The main controller then constructs groups of servicers, called servicer groups, comprising of one servicer from each party. Servicer grouping can be done at random, or can attempt to group servicers with similar location, network bandwidth, or computational capabilities together.

Each servicer group is capable of executing a circuit partition and exchanging data with other servicer groups (in this case, each servicer in the group exchanges data only with the servicer belonging to the same party in the other servicer group). The controller computer includes a module that dynamically adjusts the size of the partitions based on real-time performance metrics of each participating computer. This adjustment ensures that the computational load is balanced across the distributed system (e.g., system 200), optimizing the performance and efficiency of the SMPC process.

The main controller, in this example Controller A 206, then orchestrates the overall protocol by maintaining an ordering of circuit partitions and an assignment of circuit partitions to Servicers A1-A4. A circuit partition is eligible for execution if all of its input partitions have been computed. Initially only the data input partitions are eligible for execution; however, as these are completed, other partitions will become eligible.

With respect to failure recovery, while the probability of failure of a single computer at any given time is low, in distributed computing it is a well-known problem that as the number of computers involved in the system 200 increases, the probability of at least one failure of any computer rises quickly. The systems and methods of the present disclosure can recover from failures of Servicers 1-4 and Controller A 206 and Controller B 208. The distributed storage system 205 (e.g., Hadoop HDFS) runs alongside the servicer processes on participating computers. The distributed storage system 205 replicates data written to it across multiple participating computers, so that the data is still available in the event of a failure of one computer. As Servicers A1-A4 execute circuit partitions, they write state information and output information (for completed partitions) to the distributed storage system 205.

In the event of a servicer failure, Controller A 206 will provision a new servicer process on one of the participating computers (or requisition a new computer if a dynamic provisioning system is used). This new servicer will use the distributed storage system 205 to read the last known state data written by the failed servicer; this will allow the servicer to restart processing the most recent circuit partition and serve output data from any completed circuit partitions to other requesting Servicers A1-A4, and the system 200 can return to normal operation. In the event of a failure, the system ensures continuity and resilience by including the re-assignment of the circuit partitions and data recovery from the distributed storage system 205.

When a failure is detected, the system 200 dynamically re-assigns the affected circuit partitions to other available servicer nodes. This re-assignment process leverages the distributed storage system 205, where state information and outputs of completed partitions are persistently stored. The reassigned servicer nodes access this data to recover the last known state, allowing them to resume processing with minimal disruption. This approach enhances the fault tolerance and robustness of the distributed SMPC protocol, ensuring that computations can proceed even in the face of individual node failures.

This process minimizes data loss and reduces the time required for recovery, thereby enhancing the overall robustness and efficiency of the SMPC system. The checkpointing intervals and the specific state information to be saved can be configured based on the computational workload and performance requirements, ensuring an optimal balance between redundancy overhead and recovery speed.

The system can support resilience to failure of Controller A 206 by provisioning a backup controller for each party. While the primary controller remains functional, it sends all of its state data to the backup controller, which uses the data to maintain an equivalent state of the system. If the backup controller detects a failure of the primary controller, it sends a notification to all Servicers A1-A4 that it is taking over the role of primary controller and provisions a new backup controller process on one of the participating computers (or requisitions a new computer if a dynamic provisioning system is used). Maintaining a backup controller for each party is crucial for system reliability. The backup controller synchronizes state data with the primary controller, ensuring that it has the most up-to-date information. In the event of a primary controller failure, the backup controller can seamlessly take over operations, minimizing disruption and maintaining the integrity of the computation. This synchronization involves regular updates and checks to keep the backup controller in sync with the primary controller's state.

The Servicers A1-A4 reply to the notification with their last known state data, and the new primary controller reconciles this with the last information it received from the failed controller, notifying the servicers to re-run any circuit partitions for which the state data is inconsistent. After this process is complete, the system can return to normal operation. In one embodiment, the controller computer employs predictive algorithms to foresee potential system failures. By anticipating these failures, the controller can proactively reassign tasks to prevent disruption of the SMPC process and maintain system stability.

Figure 3:
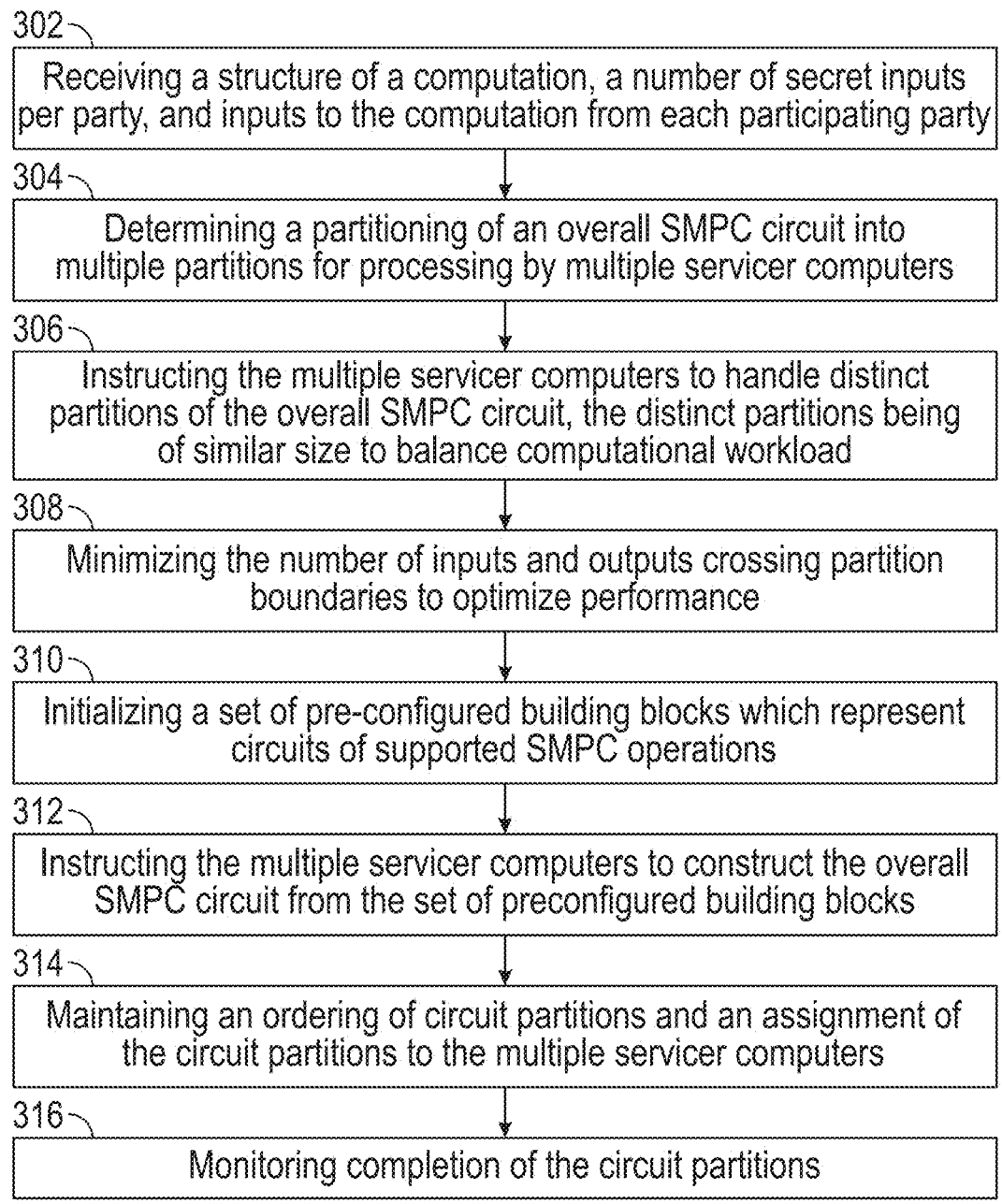
FIG. 3 illustrates a flowchart of the method for orchestrating distributed secure multi-party computations.

FIG. 3 is a flowchart of an example method of the present disclosure. The method is directed to orchestrating distributed secure multi-party computations (SMPC), executed by a controller computer system. In some embodiments, the method includes a step 302 of receiving a structure of a computation, a number of secret inputs per party, and inputs to the computation from each participating party. In this step, the main controller gathers the overall structure of the computation, specifying the type of computation (e.g., analytics, machine learning training), the number of secret inputs from each party, and the particular inputs each party will provide. This ensures that all necessary data and computation requirements are clearly defined before the protocol starts.

In one embodiment, the method includes a step 304 of determining a partitioning of an overall SMPC circuit into multiple partitions for processing by multiple servicer computers. In this step, the main controller analyzes the overall SMPC circuit and divides it into smaller, manageable partitions. This partitioning allows the computation to be distributed across multiple servicer computers, optimizing resource utilization and efficiency.

In some embodiments, the method includes a step 306 of instructing the multiple servicer computers to handle distinct partitions of the overall SMPC circuit, the distinct partitions being of similar size to balance computational workload. The main controller issues instructions to the servicer computers, ensuring that each servicer handles a partition of the SMPC circuit. The partitions are designed to be of similar size to evenly distribute the computational workload and prevent any single servicer from being overloaded.

In various embodiments, the method includes a step 308 of minimizing the number of inputs and outputs crossing partition boundaries to optimize performance. To enhance the efficiency of the distributed computation, the method involves reducing the interactions between partitions. By minimizing the number of inputs and outputs that cross partition boundaries, the method reduces communication overhead and improves overall performance.

The method includes a step 310 of initializing a set of pre-configured building blocks which represent circuits of supported SMPC operations. The main controller initializes pre-configured building blocks that represent common SMPC operations. These building blocks serve as fundamental components for constructing the overall SMPC circuit, facilitating easier and faster setup of complex computations.

According to some embodiments, the method includes a step 312 of instructing the multiple servicer computers to construct the overall SMPC circuit from the set of pre-configured building blocks. Using the pre-configured building blocks, the servicer computers are instructed to assemble the overall SMPC circuit. This approach streamlines the construction process and ensures that the circuit is built correctly and efficiently.

In one embodiment, the method includes a step 314 of maintaining an ordering of circuit partitions and an assignment of the circuit partitions to the multiple servicer computers. The main controller maintains a systematic ordering of the circuit partitions and assigns them to the servicer computers. This organizational structure helps in tracking the progress of each partition and ensures that the computation proceeds in an orderly manner.

In various embodiments, the method includes a step 316 of monitoring completion of the circuit partitions. The main controller continuously monitors the progress of the servicer computers as they work on their respective partitions. This monitoring helps in identifying any issues or delays in real-time and allows for prompt corrective actions to ensure timely completion of the computation.

In some embodiments, the method includes a step of updating the set of eligible circuit partitions. As partitions are completed, the main controller updates the set of eligible circuit partitions, making new partitions available for execution. This dynamic updating process ensures that the computation proceeds smoothly and that resources are optimally utilized throughout the execution of the SMPC protocol.

In some embodiments, a system incorporates a distributed storage system to store state and output information, which is crucial for data recovery in case of failures. For instance, consider a scenario where a servicer computer fails during the computation process. In such a case, the system provisions a new servicer computer to replace the failed one. The new servicer reads the last known state data from the distributed storage system, allowing it to resume processing from where the previous servicer left off, thus preventing significant interruptions. Additionally, the system dynamically reassigns any unfinished circuit partitions to other available servicer computers based on the most recent state data. This approach ensures that the computation can proceed smoothly and efficiently, even when individual servicers encounter failures.

To enhance computational resource availability, the system includes a feature for dynamically provisioning additional servicer computers on demand. For example, if the computational workload increases unexpectedly, the system can automatically allocate more servicer computers to handle the additional tasks. This capability ensures that the system can scale efficiently and provide the necessary resources to manage increased workloads, maintaining optimal performance.

The system groups servicer computers with similar computational capabilities and network bandwidth to optimize the execution of circuit partitions. By matching computers with comparable performance characteristics, the system ensures that computational tasks are executed efficiently. For instance, if two servicer computers have similar processing power and network speed, they can be grouped together to handle partitions of the SMPC circuit, reducing the likelihood of bottlenecks caused by disparities in processing power or network speed.

The step of monitoring the completion of circuit partitions involves continuously tracking the progress of each partition. The system detects any failures or delays in the completion of assigned partitions and promptly reassigns any unfinished partitions to other available servicer computers. For example, if a servicer computer experiences a delay or failure while processing a partition, the system can quickly reassign that partition to another servicer computer to ensure timely completion of the computation. This proactive approach helps maintain overall system performance and reliability.

The system maintains a backup controller computer for the primary controller computer. State data is synchronized between the primary and backup controllers, ensuring the backup is always up-to-date. In the event of a failure of the primary controller, the backup controller takes over operations seamlessly. For instance, if the primary controller fails, the backup controller will automatically assume control and notify the remaining servicer computers of the switch. The servicer computers will then continue normal operations based on the synchronized state data, minimizing any disruption caused by the failure.

The step of updating the set of eligible circuit partitions involves re-evaluating partition dependencies and making newly completed partitions eligible for subsequent computations. This dynamic updating process ensures that the computation proceeds efficiently. For example, as each partition of the SMPC circuit is completed, the system re-evaluates the dependencies and updates the list of eligible partitions, allowing the computation to continue smoothly and ensuring that resources are optimally utilized throughout the execution of the SMPC protocol.

Figure 4:
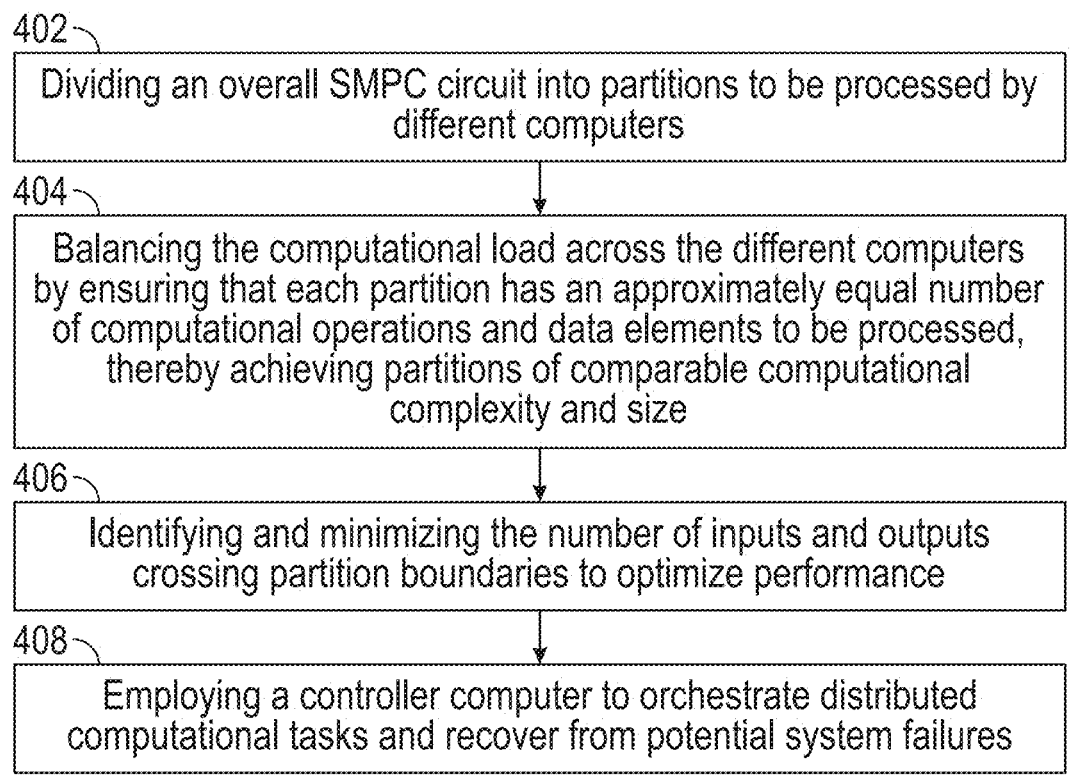
FIG. 4 illustrates a flowchart of the method for enhancing computational power in a distributed secure multi-party computation system.

FIG. 4 is a flowchart of an example method of the present disclosure. In some embodiments, the method includes a step 402 of dividing an overall SMPC circuit into partitions to be processed by different computers. This step involves analyzing the SMPC circuit and segmenting it into smaller partitions that can be distributed among multiple computers. This division allows the workload to be shared, making the computation more efficient and manageable.

According to some embodiments, the method includes a step 404 of balancing the computational load across the different computers by ensuring that each partition has an approximately equal number of computational operations and data elements to be processed, thereby achieving partitions of comparable computational complexity and size. This step ensures that no single computer is overburdened while others are underutilized, promoting an even distribution of the computational tasks.

In various embodiments, the method includes a step 406 of identifying and minimizing the number of inputs and outputs crossing partition boundaries to optimize performance. By reducing the data exchange between partitions, this step aims to enhance the efficiency of the computation process, decreasing latency and improving overall performance.

In some embodiments, the method includes a step 408 of employing a controller computer to orchestrate distributed computational tasks and recover from potential system failures. The controller computer coordinates the distributed tasks, assigns partitions to different computers, and manages recovery protocols in case of any system failures, ensuring the continuity and reliability of the computation.

To optimize performance, the method includes dividing the overall SMPC circuit into partitions while minimizing inter-partition communication. This approach reduces the communication overhead, enhancing the efficiency of the SMPC process. By analyzing the circuit and its data dependencies, the system can create partitions that require minimal data exchange across boundaries, optimizing the performance of distributed computations. Minimizing inter-partition communication is essential for optimizing performance in SMPC systems. By reducing the amount of data exchanged between partitions, the system decreases communication overhead and latency. This optimization is achieved by carefully designing the partitions to limit the number of inputs and outputs that cross partition boundaries. As a result, the overall performance of the distributed computation is significantly improved.

Balancing the computational load involves adjusting the size of the partitions to ensure an even distribution of work across the distributed system. The controller computer continuously monitors performance metrics of each participating computer and dynamically adjusts partition sizes. This prevents any single computer from becoming a bottleneck, ensuring efficient use of resources across the system. Balancing the computational load involves adjusting the size of the partitions to ensure an even distribution of work across the distributed system. The controller computer continuously monitors the performance metrics of each participating computer and dynamically adjusts partition sizes. This proactive adjustment helps prevent any single computer from becoming a bottleneck, ensuring that all available computational resources are utilized effectively and efficiently.

In some instances, the controller computer secures data transmitted between partitions using cryptographic protocols to prevent unauthorized access. These protocols ensure that all data exchanged between partitions remains confidential and its integrity is protected, safeguarding the privacy of the inputs and outputs in the SMPC process. The controller computer secures data transmitted between the partitions using cryptographic protocols to prevent unauthorized access during the computation process. These protocols ensure that all data exchanged between partitions remains confidential and its integrity is protected, safeguarding the privacy of the inputs and outputs in the SMPC process.

In one embodiment, the method employs redundancy and checkpointing techniques to periodically save the state of the computation, allowing for restoration and continuation in case of a failure. Checkpointing involves periodically saving the current state to a distributed storage system, ensuring the system can resume from the last saved state if a failure occurs. This process minimizes data loss and reduces recovery time, enhancing the robustness and reliability of the system.

In various embodiments, the controller computer monitors system performance continuously and reassigns computational tasks as necessary to maintain stability and performance. This reassignment process helps balance the workload and ensures the efficient operation of the SMPC system, preventing any single point of failure from disrupting the overall computation. The controller computer monitors system performance continuously and reassigns computational tasks as necessary to maintain stability and performance. By tracking the status and workload of each servicer computer, the controller can detect imbalances or potential failures early. When such issues are identified, the controller reassigns tasks to ensure that the computational load is evenly distributed and that the system continues to operate smoothly without interruption.

Figure 5:
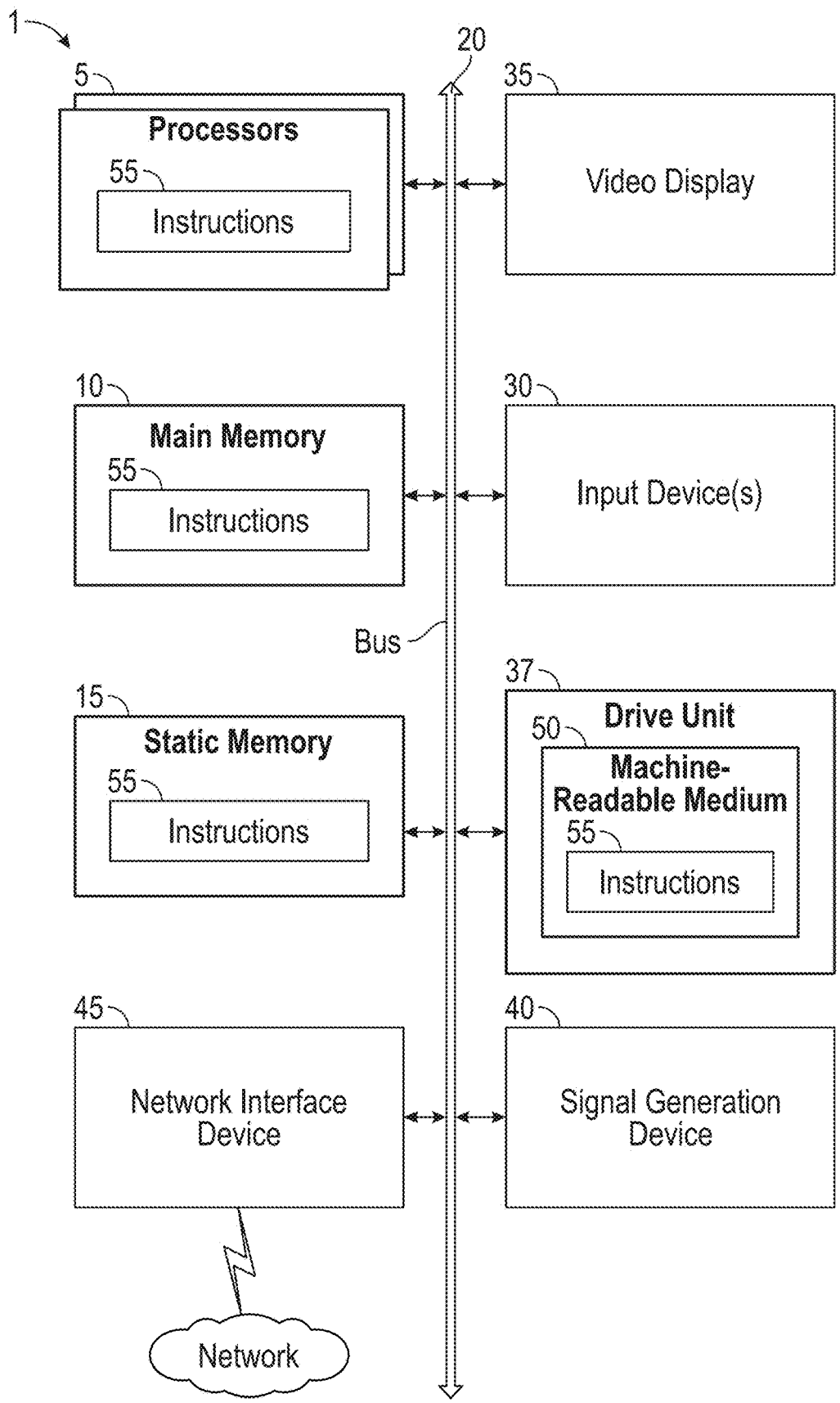
FIG. 5 illustrates a diagrammatic representation of an example machine in the form of a computer system.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in hardware, software, firmware, digital components, or analog components. For example, the encoding and decoding systems can be embodied as one or more application-specific integrated circuits (ASICs) or microcontrollers programmed to carry out the described systems and procedures. Certain terms used throughout the description and claims refer to specific system components. Components may be referred to by different names, but the document does not intend to distinguish between components that differ in name but not function.

One skilled in the art will recognize that the Internet service may be configured to provide Internet access to one or more computing devices coupled to the Internet service. These computing devices may include one or more processors, buses, memory devices, display devices, input/output devices, and the like. Additionally, the Internet service may be coupled to one or more databases, repositories, servers, and similar resources utilized to implement any of the embodiments described herein.

The corresponding structures, materials, acts, and equivalents of all means or step-plus-function elements in the claims are intended to include any structure, material, or act for performing the function in combination with other claimed elements as specifically claimed. The description of the present technology is presented for illustrative purposes and is not intended to be exhaustive or limited to the disclosed form. Many modifications and variations will be apparent to those skilled in the art without departing from the scope and spirit of the technology. Exemplary embodiments were chosen and described to best explain the principles of the technology and its practical application, enabling others to understand various embodiments with suitable modifications.

If any disclosures are incorporated herein by reference and such incorporated disclosures conflict with the present disclosure, the present disclosure controls. If such incorporated disclosures conflict with each other, the later-dated disclosure controls.

The terminology used herein can imply direct or indirect, full or partial, temporary or permanent, immediate or delayed, synchronous or asynchronous, action or inaction. For example, when an element is referred to as being "on," "connected," or "coupled" to another element, it can be directly on, connected, or coupled to the other element, and/or intervening elements may be present. In contrast, when an element is referred to as being "directly connected" or "directly coupled" to another element, no intervening elements are present.

The terminology used herein is for the purpose of describing particular embodiments and is not intended to be limiting. As used herein, the singular forms "a," "an," and "the" include plural forms unless the context clearly indicates otherwise. The terms "comprises," "includes," and/or "comprising," "including" specify the presence of stated features, integers, steps, operations, elements, and/or components but do not preclude the presence or addition of one or more other features, integers, steps, operations, elements, components, and/or groups thereof.

Example embodiments of the present disclosure are described with reference to idealized illustrations. Variations from the shapes of the illustrations due to manufacturing techniques and/or tolerances are to be expected. Thus, the example embodiments should not be construed as limited to the particular shapes illustrated but include deviations resulting from manufacturing.

Aspects of the present technology are described with reference to flowchart illustrations and/or block diagrams of methods, apparatus (systems), and computer program products. Each block of the flowchart illustrations and/or block diagrams and combinations of blocks can be implemented by computer program instructions. These instructions may be provided to a processor of a general-purpose computer, special-purpose computer, or other programmable data processing apparatus to produce a machine, creating means for implementing the functions/acts specified in the flowcharts and/or block diagrams.

For explanation and not limitation, specific details are set forth, such as particular embodiments, procedures, techniques, etc., to provide a thorough understanding of the present disclosure. However, the present disclosure may be practiced in other embodiments that depart from these specific details.

Reference to "one embodiment" or "an embodiment" means that a particular feature, structure, or characteristic described in connection with the embodiment is included in at least one embodiment. The phrases "in one embodiment" or "in an embodiment" at various places are not necessarily referring to the same embodiment. Features, structures, or characteristics may be combined in any suitable manner in one or more embodiments. Depending on the context, a singular term may include its plural forms and vice versa. Similarly, hyphenated terms, capitalized terms, plural terms with or without apostrophes, and italicized terms may be used interchangeably without inconsistency.

Some embodiments may be described in terms of "means for" performing a task or set of tasks. A "means for" may include a structure, such as a processor, memory, an I/O device, or combinations thereof. Alternatively, the "means for" may include an algorithm, a mathematical formula, prose, or as a flow chart or signal diagram.

What is claimed is:

1. A method for orchestrating distributed secure multi-party computations (SMPC), executed by a controller computer system, the method comprising:
   receiving a structure of a computation, a number of secret inputs per party, and inputs to the computation from each party;
   determining a partitioning of an overall SMPC circuit into multiple partitions for processing by multiple servicer computers;
   instructing the multiple servicer computers to handle distinct partitions of the overall SMPC circuit, the distinct partitions being of similar size to balance computational workload;
   minimizing a number of inputs and outputs crossing partition boundaries to optimize performance;
   initializing a set of pre-configured building blocks that represent circuits of supported SMPC operations;
   instructing the multiple servicer computers to construct the overall SMPC circuit from the set of pre-configured building blocks;
   maintaining an ordering of circuit partitions and an assignment of the circuit partitions to the multiple servicer computers; and
   monitoring completion of the circuit partitions.

2. The method of claim 1, further comprising:
   utilizing a distributed storage system for storing state and output information to facilitate data recovery;
   provisioning a new servicer upon a servicer computer failure;
   allowing the new servicer to read a last known state data from the distributed storage system to continue processing; and
   dynamically re-assigning unfinished circuit partitions to other available servicer computers based on latest state data.

3. The method of claim 1, further comprising dynamically provisioning additional servicer computers on-demand to enhance computational resource availability.

4. The method of claim 1, further comprising grouping servicer computers with similar computational capabilities and network bandwidth to optimize execution of the circuit partitions.

5. The method of claim 1, wherein monitoring the completion of the circuit partitions includes:
   continuously tracking progress of each circuit partition;
   detecting failures or delays in the completion of assigned circuit partitions; and
   reassigning unfinished circuit partitions to other available servicer computers to ensure continuity and timely completion of the computation.

6. The method of claim 1, further comprising:
   maintaining a backup controller computer for a primary controller computer;
   synchronizing state data between the primary controller computer and the backup controller computer;
   enabling the backup controller computer to take over operations upon a failure of the primary controller computer; and
   notifying remaining servicer computers of a switch to the backup controller computer and resuming normal operations based on state data that has been synchronized.

7. The method of claim 1, wherein updating a set of eligible circuit partitions includes re-evaluating partition dependencies and making newly completed partitions eligible for subsequent computations.

8. A method for enhancing computational power of secure multi-party computations (SMPC) in a distributed system, the method comprising:
   dividing an overall SMPC circuit into partitions to be processed by different computers;
   balancing a computational load of the overall SMPC circuit across the different computers by ensuring that each partition has an approximately equal number of computational operations and data elements to be processed, thereby achieving partitions of comparable computational complexity and size;
   identifying and minimizing a number of inputs and outputs crossing partition boundaries to optimize performance; and
   employing a controller computer to orchestrate distributed computational tasks and recover from potential system failures.

9. The method of claim 8, wherein dividing the overall SMPC circuit into partitions includes minimizing inter-partition communication to optimize performance.

10. The method of claim 8, wherein balancing the computational load includes adjusting the size of the partitions to ensure similar workload distribution across the distributed system.

11. The method of claim 8, wherein the controller computer secures data transmitted between the partitions using cryptographic protocols to prevent unauthorized access during a computation process.

12. The method of claim 8, further comprising using redundancy and checkpointing techniques to periodically save a state of a computation process, allowing for restoration and continuation in case of a failure.

13. The method of claim 8, wherein the controller computer monitors system performance and reassigns computational tasks to maintain stability and performance.

14. A distributed secure multi-party computation (SMPC) system, comprising:
- multiple computers, each administered by a participating party, each configured to handle different parts of an overall SMPC circuit through a process of circuit partitioning, wherein circuit partitions balance a workload between the multiple computers and are designed to minimize inputs and outputs crossing partition boundaries; and
- a controller computer responsible for orchestrating distribution of computational tasks, assignment of the partitions, and recovery of system operation upon a failure.

15. The system of claim 14, wherein each computer is configured to handle computations on private data within a secure environment to ensure data integrity and confidentiality.

16. The system of claim 14, wherein the controller computer includes a module that adjusts assignment of circuit partitions based on computational load and performance metrics of each participating computer.

17. The system of claim 14, wherein communication between the controller computer and the multiple computers uses cryptographic protocols to ensure confidentiality and integrity of data exchanged.

18. The system of claim 14, further comprising a subsystem within the controller computer configured to track a status and performance of each computer continuously.

19. The system of claim 14, wherein the controller computer employs predictive algorithms to foresee potential system failures and reassigns tasks to maintain stability and performance.

20. The system of claim 14, wherein the system incorporates redundancy by maintaining backup copies of critical data and computation states across the multiple computers, enabling seamless recovery and continuation of the SMPC process upon a failure.

* * * * *